US010648881B2

(12) United States Patent
Mirshafiei et al.

(10) Patent No.: US 10,648,881 B2
(45) Date of Patent: May 12, 2020

(54) SEISMIC RESPONSE ASSESSMENT OF MAN-MADE STRUCTURES

(71) Applicants: Farshad Mirshafiei, Montreal (CA); Ghyslaine McClure, Longueuil (CA)

(72) Inventors: Farshad Mirshafiei, Montreal (CA); Ghyslaine McClure, Longueuil (CA)

(73) Assignee: 9420410 CANADA INC., Montreal (CA)

( * ) Notice: Subject to any disclaimer, the term of this patent is extended or adjusted under 35 U.S.C. 154(b) by 61 days.

(21) Appl. No.: 15/561,387

(22) PCT Filed: Mar. 23, 2016

(86) PCT No.: PCT/CA2016/050336
§ 371 (c)(1),
(2) Date: Sep. 25, 2017

(87) PCT Pub. No.: WO2016/149823
PCT Pub. Date: Sep. 29, 2016

(65) Prior Publication Data
US 2018/0106696 A1    Apr. 19, 2018

Related U.S. Application Data

(60) Provisional application No. 62/136,875, filed on Mar. 23, 2015.

(51) Int. Cl.
G01M 1/10 (2006.01)
E04H 9/00 (2006.01)
(Continued)

(52) U.S. Cl.
CPC .............. *G01M 1/10* (2013.01); *G01M 1/122* (2013.01); *G01M 7/02* (2013.01); *G01V 1/008* (2013.01); *E04H 9/00* (2013.01)

(58) Field of Classification Search
CPC .......... G01M 1/10; G01M 1/122; G01M 7/02; G01V 1/008; E04H 9/00
See application file for complete search history.

(56) References Cited

PUBLICATIONS

Asgarian et al., Impact of Seismic Retrofit and Presence of Terra Cotta Masonry Walls on the Dynamic Properties of a Hospital Building in Montreal, Canada, 2012, 15 WCEE, Lisboa, 10 pp. (Year: 2012).*

(Continued)

Primary Examiner — Toan M Le
(74) Attorney, Agent, or Firm — Norton Rose Fulbright Canada LLP

(57) ABSTRACT

The present disclosure is drawn to methods and systems for determining a seismic response of a man-made structure to a given input earthquake. Sensors are used to obtain vibration data for data collection locations from one or more floors of the man-made structure, which may be ambient vibration data or vibration data resulting from forced vibration or shock testing. The vibration data is used to determine modal characteristics for the man-made structure, including mode shapes, natural frequencies, and damping ratios. The mass, centre-of-mass, and moment of inertia is also determined for the floors of the man-made structure. The modal characteristics are then translated from the data collection locations to the centre-of-mass based on the structure of the floors. Then, a seismic response of the man-made structure to an input earthquake is determined using the translated modal characteristics and the mass and moment of inertia of the floors.

18 Claims, 12 Drawing Sheets

(51) Int. Cl.
  G01M 7/02   (2006.01)
  G01M 1/12   (2006.01)
  G01V 1/00   (2006.01)

(56) References Cited

PUBLICATIONS

Bruneau et al., Normalizing Inelastic Seismic Response of Structures Having Eccentricities in Plan, Dec. 1990, Journal of Structural Engineering, vol. 116, No. 12, pp. 3358-3379 (Year: 1990).*
Celebi, M. (2007). On the variation of fundamental frequency (period) of an undamaged building—a continuing discussion. Proceedings of the international conference on Experimental Vibration Analysis for Civil Engineering Structures (EVACES'07), Porto, Portugal, Oct. 2007, pp. 317-326.
Celebi, M. (2009). Comparison of recorded dynamic characteristics of structures and ground during strong and weak shaking. Increasing Seismic Safety by Combining Engineering Technologies and Seismological Data, 99-115.
Boutin, C., Hans, S., Ibraim, e., Roussillon, P. (2005). In situ experiments and seismic analysis of existing buildings. Part II: Seismic integrity threshold. Earthquake Engineering & Structural Dynamics 34(12): p. 1531-1546.
Dunand, F., Guéguen, P., Bard, P.Y., Rodgers, J., Celebi, M. (2006). Comparison of the dynamic behaviour extracted from weak, moderate and strong motion recorded in buildings. Proceedings of the first European conference on earthquake engineering and seismology, Geneva, Switzerland, Sep. 3-8, paper #1021.
Dunand, F., Rodgers, J.E., Acosta, A.V., Salsman, M., Bard, P.Y., Celebi, M. (2004). Ambient vibration and earthquake strong-motion data sets for selected USGS extensively instrumented buildings. Open-File Rep. No. 2004-1375, U.S. Geological Survey, Menlo Park, Calif.
Hans, S., Boutin, C., Chesnais, C. (2008). How far in situ measurements may help to assess building vulnerability?. In Proceeding of the 14th World Conference on Earthquake engineering, Beijing, China, 8 p.
Hans, S., Boutin, C., Ibraim, E., Roussillon, P. (2005). In situ experiments and seismic analysis of existing buildings. Part I: experimental investigations. Earthquake Engineering & Structural Dynamics 34:12, 1513-1529.
Michel, C., Guéguen, P. (2009). Seismic vulnerability analysis of moderate seismicity areas using in situ experimental techniques: from the building to the city scale? Application to Grenoble and Pointe-\a-Pitre (France). Arxiv preprint arXiv:0907.1735.
Michel, C., Guéguen, P., Bard, P.Y. (2008). Dynamic parameters of structures extracted from ambient vibration measurements: An aid for the seismic vulnerability assessment of existing buildings in moderate seismic hazard regions. Soil Dynamics and Earthquake Engineering 28:8, 593-604.

Michel, C., Guéguen, P., Causse, M. (2012). Seismic vulnerability assessment to slight damage based on experimental modal parameters. Earthquake Engineering & Structural Dynamics 41(1):81-98.
Singh, J.P, Agarwal, P., Kumar, A., Thakkar, S.K. (2014). Identification of Modal Parameters of a Multistoried RC Building using Ambient Vibration and Strong Vibration Records of Bhuj Earthquake, 2001. Journal of Earthquake Engineering, V 18, p. 444-457, DOI: 10.1080/13632469.2013.856823.
Todorovska, M., Trifunac, M.D., Hai, T.Y. (2006). Variations of apparent building frequencies—lessons from full-scale earthquake observations. Proceedings of the first European conference on earthquake engineering and seismology, Sep. 3-8, Geneva, Switzerland, paper #1547.
Todorovska, M.I., Hao, T.Y., Trifunac, M.D. (2007). Building periods for use in earthquake resistant design codes—Earthquake response data compilation and analysis of time and amplitude variations, Report CE 04-02, University of Southern California, Department of Civil Engineering, Los Angeles, California.
Trifunac, M.D. (1972). Comparisons between ambient and forced vibration experiments. Earthquake Engineering & Structural Dynamics 1:2, 133-150.
F. Mirshafiei, G. McClure, Modified three-dimensional seismic assessment method for buildings based on ambient vibration tests: extrapolation to higher shaking levels and measuring the dynamic amplification portion of natural torsion, Earthquake Engineering and Struct Dynamics, 45 (12) (2016), pp. 2011-2026, 10.1002/eqe.2746.
Mirshafiei F, McClure G. Application of a three-dimensional seismic assessment method (3D-SAM) based on ambient vibration tests to few buildings located in Montreal. 11th Canadian Conference on Earthquake Engineering, Victoria, BC, Canada, Jul. 21-24, 2015, 10 p.
Mirshafiei F, McClure G. Experimental modal analysis of emergency shelters in Montréal. Canada, Proc. 15WCEE, Lisbon, Portugal, Sep. 24-28, 2012, Paper 4437, 10 p.
Mirshafiei F, Asgarian A, McClure G. Operational modal analysis of low rise buildings in Montréal, Canada. 4th International Structural Specialty Conference, CSCE 2014, Halifax, Paper CST-46, 2014, 9 p.
Mirshafiei F, Mirshafiei M, McClure G (2017): A new three-dimensional seismic assessment method (3D-SAM) for buildings based on experimental modal analysis. Computers & Structures, vol. 180, pp. 125-137.
McClure, G. et al. Seismic assessment of buildings and their OFCs using AVM and experimental FRS. Proceedings of the 9th International Conference on Structural Dynamics, EURODYN 2014, Jun. 30, 2014.
Miskovic, Z. et al. Effects of full-height non-structural partitions on modal properties of two nominally identical building floors. Canadian Journal of Civil Engineering vol. 36, Issue No. 7 pp. 1121 to 1132, Jul. 10, 2009.

* cited by examiner

SEISMIC RESPONSE ASSESSMENT OF MAN-MADE STRUCTURES

CROSS-REFERENCE TO RELATED APPLICATIONS

The present application is a US National Stacie of International Application No. PCT/CA2016/050336, filed on Mar. 3, 2016, which claims priority under 35 U.S.C. 119(e) of United States Provisional Patent Application No. 62/136,875, filed on Mar. 23, 2015, and entitled "Seismic Response Assessment of Man-Made Structures", the contents of which are hereby incorporated by reference.

TECHNICAL FIELD

The present disclosure is drawn generally to structural engineering, and more specifically to the seismic assessment of man-made structures.

BACKGROUND

Evaluation of the seismic performance of buildings is often conducted as a first step of a risk mitigation process for an existing building. The issue of seismic evaluation of existing buildings has become increasingly important in recent decades, especially in the context of performance-based design. The purpose of this evaluation is to assess and/or predict the building's behaviour during an earthquake or other seismic event, to identify whether the structure is in need of preventive retrofit, and to provide a reference condition to recognize damage in the building after the occurrence of a design-level earthquake.

Typical seismic response assessment methods for buildings are based on linear and nonlinear static and/or dynamic analysis approaches. However, according to one survey conducted on the topic of seismic response assessment methods in structural engineering firms in the United States, the results obtained from the numerical models of the existing approaches are inherently uncertain and variable, as different analysis methods lead to significantly different results. Moreover, the general complexity of existing methods, the sensitivity of the inelastic analysis approaches to assumptions regarding such parameters as initial stiffness, and the invariance of the loading patterns used in nonlinear static analysis procedures are also shortcomings of existing seismic response assessment methods.

Therefore, there is a need for developing alternative simplified seismic evaluation methods.

SUMMARY

The present disclosure is drawn to methods and systems for determining a seismic response of a man-made structure to a given input earthquake. Sensors are used to obtain vibration data for data collection locations from one or more floors of the man-made structure, which may be ambient vibration data or vibration data resulting from forced vibration or shock testing. The vibration data is used to determine modal characteristics for the man-made structure, including mode shapes, natural frequencies, and damping ratios. The mass, centre-of-mass, and moment of inertia is also determined for the floors of the man-made structure. The modal characteristics are then translated from the data collection locations to the centre-of-mass based on the structure of the floors. Then, a seismic response of the man-made structure to an input earthquake is determined using the translated modal characteristics and the mass and moment of inertia of the floors.

In accordance with a broad aspect, there is provided a method, comprising: acquiring vibration data for data collection locations from sensors for at least one floor of a man-made structure; determining modal characteristics of the at least one floor based on the vibration data; determining a mass, a centre-of-mass location, and a moment of inertia of the at least one floor; translating the modal characteristics from the data collection locations to the centre-of-mass location based on a floor structure of the at least one floor; and determining a seismic response of the man-made structure to an input earthquake using the translated modal characteristics, the mass, and the moment of inertia of the at least one floor.

In some embodiments, determining the seismic response comprises performing a linear-range time-domain convolution of the input earthquake with the translated modal characteristics.

In some embodiments, the method further comprises associating a level of destruction to the man-made structure as a result of the input earthquake based on the seismic response of the man-made structure.

In some embodiments, determining the mass, the centre-of-mass location, and the moment of inertia comprises: determining a floor structure mass; determining a non-structural elements mass; and determining the centre-of-mass based on the floor structure mass and the non-structural elements mass.

In some embodiments, determining the seismic response comprises at least one of: determining a structural elements seismic response based on the floor structure mass; and determining a non-structural elements seismic response, comprising extrapolating at least one of acceleration, displacement, and drift ratio values at least one non-structural element position based on the translated modal characteristics and the non-structural elements mass and at least one of non-structural elements stiffness and non-structural elements natural frequency.

In some embodiments, wherein determining the seismic response comprises applying modal modification factors to at least some of modal characteristics.

In some embodiments, determining the seismic response comprises: determining a linear seismic response of the man-made structure to an input earthquake using the translated modal characteristics, the mass, and the moment of inertia of the at least one floor; and determining a non-linear response from the linear response based on at least one of a structural system, structure size, structure material, structure connection types, and lateral load resisting system properties.

In some embodiments, determining modal characteristics comprises obtaining a training dataset of known vibration response data of other man-made structures; training a modal characteristics engine with the training dataset; and determining the modal characteristics with the trained modal characteristics engine.

In some embodiments, determining modal modification factors comprises obtaining a training dataset of known modal modification factors of other man-made structures; training a modal characteristics adjustment module with the training dataset; and determining the modal modification factors with the trained modal characteristics adjustment module.

In some embodiments, translating the modal characteristics from the data collection locations to the centre-of-mass location based on a floor structure is performed by one of a graphical analysis and algorithmic optimization.

In some embodiments, the man-made structure is a building. In some embodiment, the at least one floor includes a roof and/or a basement of the building.

In some embodiments, determining the mass, the centre-of-mass location, and the moment of inertia comprises partitioning the floor into at least two partitions; and determining the mass, the centre-of-mass, and the moment of inertia for each partition; wherein translating the modal characteristics and determining a seismic response is performed on a per-partition basis In accordance with a broad aspect, there is provided system, comprising: a processing unit; and a memory communicatively coupled to the processing unit and comprising computer-readable program instructions executable by the processing unit. The computer-readable program instructions are executable by the processing unit for: acquiring vibration data for data collection locations from sensors for at least one floor of a man-made structure; determining modal characteristics of the at least one floor based on the vibration data; determining a mass, a centre-of-mass location, and a moment of inertia of the at least one floor; translating the modal characteristics from the data collection locations to the centre-of-mass location based on a floor structure of the at least one floor; and determining a seismic response of the man-made structure to an input earthquake using the translated modal characteristics, the mass, and the moment of inertia of the at least one floor.

In some embodiments, determining the seismic response comprises performing a linear-range time-domain convolution of the input earthquake with the translated modal characteristics.

In some embodiments, the computer-readable program instructions are further executable by the processing unit for associating a level of destruction to the man-made structure as a result of the input earthquake based on the seismic response of the man-made structure.

In some embodiments, determining the mass, the centre-of-mass location, and the moment of inertia comprises: determining a floor structure mass; determining a non-structural elements mass; and determining the centre-of-mass based on the floor structure mass and the non-structural elements mass.

In some embodiments, determining the seismic response comprises at least one of: determining a structural elements seismic response based on the floor structure mass; and determining a non-structural elements seismic response, comprising extrapolating at least one of acceleration, displacement, and drift ratio values at least one non-structural element position based on the translated modal characteristics and the non-structural elements mass and at least one of non-structural elements stiffness and non-structural elements natural frequency.

In some embodiments, determining the seismic response comprises applying modal modification factors to at least some of the modal characteristics.

In some embodiments, determining the seismic response comprises determining a linear seismic response of the man-made structure to an input earthquake using the translated modal characteristics, the mass, and the moment of inertia of the at least one floor; and determining a non-linear response from the linear response based on at least one of a structural system, structure size, structure material, structure connection types, and lateral load resisting system properties.

In some embodiments, determining modal characteristics comprises: obtaining a training dataset of known vibration response data of other man-made structures; training a modal characteristics engine with the training dataset; and determining the modal characteristics with the trained modal characteristics engine.

In some embodiments, determining modal modification factors comprises: obtaining a training dataset of known modal modification factors of other man-made structures; training a modal characteristics adjustment module with the training dataset; and determining the modal modification factors with the trained modal characteristics adjustment module.

In some embodiments, translating the modal characteristics from the data collection locations to the centre-of-mass location is performed by one of a graphical analysis and algorithmic optimization.

In some embodiments, the man-made structure is a building. In some embodiment, the at least one floor includes a roof and/or a basement of the building.

In some embodiments, determining the mass, the centre-of-mass location, and the moment of inertia comprises partitioning the floor into at least two partitions; and determining the mass, the centre-of-mass, and the moment of inertia for each partition, wherein translating the modal characteristics and determining a seismic response is performed on a per-partition basis.

In the present disclosure, examples are illustrated with a building as the man-made structure. However, it should be understood that the man-made structure may also be another type of structure, such as a bridge, a tunnel, a tower, a viaduct, and the like. Reference to a "floor" in the present disclosure includes any surface of a man-made structure, such as a bridge deck, a tunnel floor, and the like.

DETAILED DESCRIPTION

Figure 1:
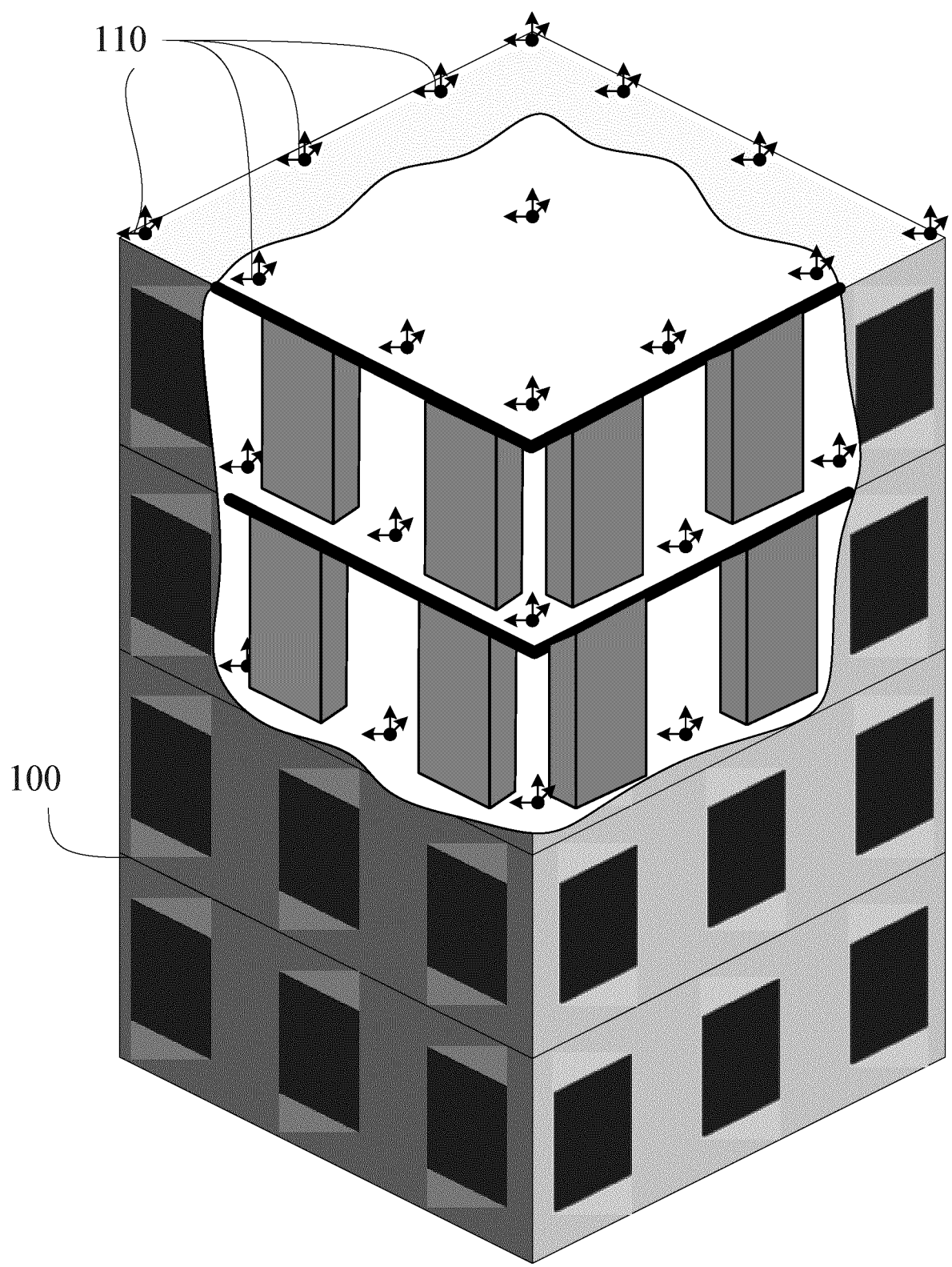
FIG. 1 is a partial cutaway view of a multi-story building outfitted with seismic sensors.

With reference to FIG. 1, there is shown an example man-made structure, namely a building 100. The building 100 has any given number of floors, and can be made of any suitable structure and materials, including steel, concrete, wood, and the like. The building 100 may have any number of basement floors (not illustrated), and has a roof above the topmost floor. Dispersed throughout the building 100 are sensors 110. There may be any given number of sensors 110, and the sensors 110 may be dispersed across one or more floors of the building 100. In some cases, each floor of the building 100 is provided with sensors 110 at a given time. Alternatively, a single set of sensors 110 can be dispersed throughout a series of floors one-or-more-at-a-time, in any suitable chronological succession. In some cases, the sensors are be dispersed throughout every second floor, or every third floor, or in any other suitable pattern.

In some embodiments, the sensors 110 are motion sensors which are used to measure ambient vibrations of the building 100 and to collect vibration data corresponding to data collection locations. The sensors 110 may be one-dimensional, two-dimensional, or three-dimensional, and can detect displacement, velocity, and acceleration for the location at which each sensor 110 is situated. In some cases, the sensors collect data in more than three dimensions, including, for example, rotational motions, and the like. The sensors 110 can be implemented using any suitable technology, including microelectromechanical systems (MEMS), piezoelectric systems, optical systems, geophones, and the like. In some cases, the sensors 110 are permanently placed within the building 100, such as in the structure of the building. Alternatively, the sensors 110 are temporarily placed at various locations on the floor(s) of the building 100. In some embodiments, the sensors 110 include both permanent and temporary sensors 110. In some embodiments, the sensors are also, or alternatively, used to measure vibrations of the building 100 resulting from forced vibration tests, shock tests, and any other suitable test.

The particular number of sensors 110 and the locations at which the sensors 110 are dispersed throughout the floor(s) of the building 100 may vary based on the floor layout of each floor, the primary and secondary materials which make up the building 100, and/or the structural system of the building 100. Fewer sensors 110 may be used in high-rise buildings or buildings with rigid floors, whereas more sensors 110 may be used in buildings which are low-rise or which have flexible roofs. For example, three one-dimensional sensors 110 are located at different corner joints when the building 100 has a square floor layout and rigid floors. Comparatively, two-dimensional sensors 110 are placed at every third-span along both the width and the length of the floor when the building 100 has a flexible roof. Other factors may also affect the number of sensors 110 and their location. In some embodiments, sensors 110 are located at the corner joints of the building 100. More sensors 110 can be used to obtain vibration data if the corner joints are not easily accessible, for example by deploying the sensors 110 within the building 100.

In some embodiments, other types of sensors are be used to acquire the vibration data. For example, the sensors 110 can be cameras or other image-capturing sensors, such as high-speed cameras, located outside the building 100 and which capture video data of the building 100 and are coupled to an image processing system. The image processing system can process video data of the building 100 and determine vibration data for the building 100. As another example, the sensors 110 can be laser-based sensors located outside the building 100 and which detect vibrations in the building based on laser detection. Other approaches are also considered. Each sensor 110 acquires vibration data for at least one given data collection location on the floor 200. In embodiments where the sensors 110 are located within the building 100, the data collection location is the location of the sensors 110 on the floor 200. In embodiments where the sensors 110 are located outside the building 100, the sensors 110 acquire vibration data about one or more data collection locations situated within the floor 200.

Figure 2:
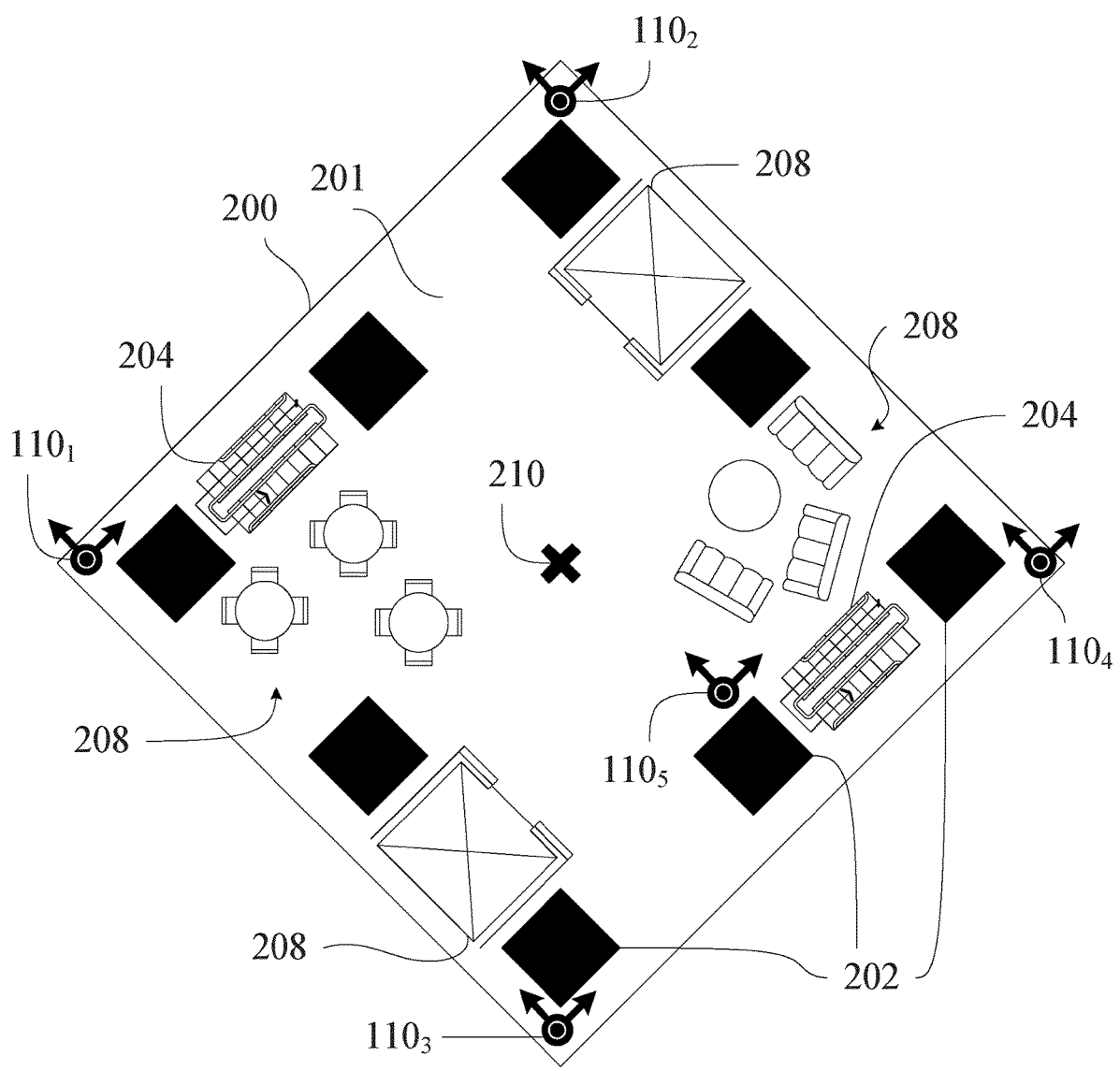
FIG. 2 is an overhead view of a floor plan of a single story of the multi-story building.

With reference to FIG. 2, a floor plan of a floor 200 of the building 100 is shown with a number of sensors $110_1$ to $110_5$ dispersed at given data collection locations. The sensors $110_1$ to $110_5$ are used to collect vibration data about the floor 200 to determine a seismic response of the building 100 to an input earthquake.

A number of structural elements may be located on the floor 200, including any given number of structural supports 202. The structural supports 202 may run through a floor surface 201, and include pillars, walls, sheer walls, frames, braces, and the like. The particular number and location of the structural supports 202 varies from building to building. Other structural elements, such as staircases 204, may also be located on the floor 200. A floor structure mass is determined as a sum of masses of all the various structural elements, including the floor surface 201. The floor structure mass may be a single value expressing the total mass of structural elements, or may be a series of values associated with coordinates or other spatial information to express the distribution of mass over a surface area of the floor 200. For example, the floor 200 can be partitioned into a grid or array, with each element in the grid being a 1 $m^2$ subsection of the floor, with each element having a respective mass value indicative of the mass of that subsection of the floor.

Non-structural elements 208, such as the elevators and the furniture, supported on the floor surface 201 are also located within the floor 200, and may include infill walls, suspension ceilings, furniture, equipment, office electronics, supply cabinets, appliances, and the like. The non-structural elements mass is determined as a sum of masses of all the various non-structural elements 208. The non-structural elements mass may be a single value expressing the total mass of non-structural elements, or may be a series of values associated with coordinates to express the distribution of mass over a surface area of the floor 200. An overall floor mass is determined by adding the floor structure mass to the non-structural elements mass. A centre-of-mass 210 of the floor 200 is determined based on the floor structure mass and the non-structural elements mass. The centre-of-mass 210 may be expressed as coordinates, as a distance from a given reference point, or in any other suitable fashion. Furthermore, a moment of inertia of the floor 200 is determined based on the floor mass and the floor layout. In embodiments where the floor 200 is partitioned into subsections, each subsection can be assigned a respective centre-of-mass and moment of inertia.

Figure 3:
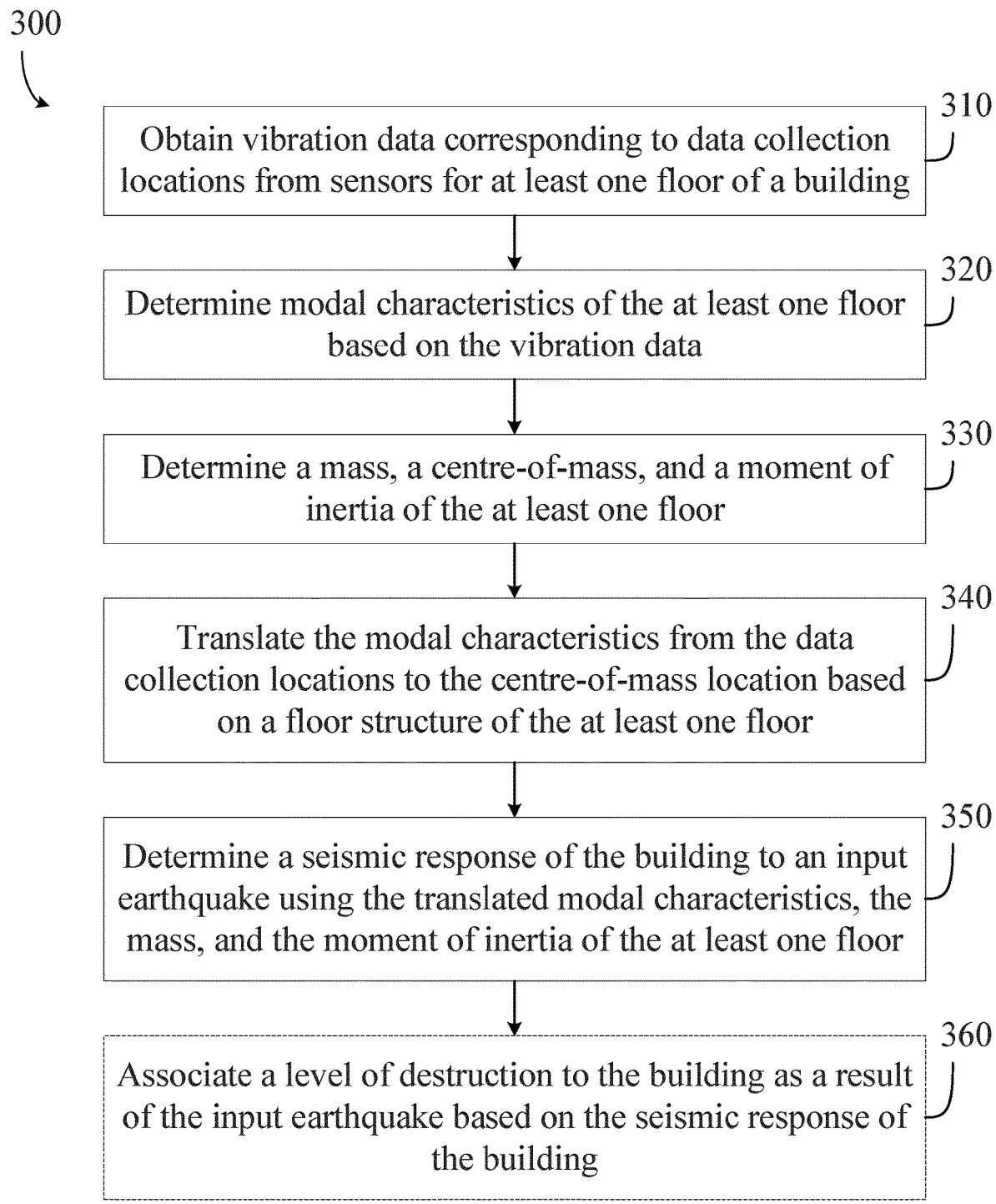
FIG. 3 is a flowchart illustrating an example method for assessing a seismic response of the multi-story building.

With reference to FIG. 3, there is illustrated a method 300 for determining a seismic response of the building 100 to an input earthquake. The method can be implemented, for example, by any suitable computing device. At step 310, the computing device acquires vibration data from the sensors 110 which, as discussed hereinabove, are positioned at data collection locations on at least one floor, such as the floor 200, of the building 100. The sensors 110 can be configured for providing the vibration data to the computing device via any suitable wired or wireless communication paths, including RS-232, USB, USB 2.0, USB 3.0, USB-C, SATA, e-SATA, Thunderbolt™, Ethernet, Wi-Fi, Zigbee™ Bluetooth™, and the like. Alternatively, the sensors 110 can provide the vibration data to a database, by any suitable means, which is accessible to the computing device. The computing device may then acquire the vibration data from the database. The vibration data also includes information about the location of the sensors, which may be provided as coordinates, as a distance from a fixed point on the floor 200, or in any other suitable fashion.

At step 320, the computing device determines modal characteristics of the floor 200 based on the vibration data. Modal characteristics are indicative of the way in which a given building, such as the building 100, reacts to vibrations. Modal characteristics include mode shapes, natural frequencies, and damping ratios. The modal characteristics may be obtained using any suitable algorithm and/or model. In some cases, the modal characteristics are determined using frequency domain decomposition of the vibration data. Alternative methods for obtaining the modal characteristics include time domain decomposition, mixed-domain (both time and frequency) domain methods, machine-learning algorithms, wavelet methods, and the like. In some embodiments, estimations or extrapolations from modal characteristics for similar buildings or based on reference tables are also used to determine one or more of the modal characteristics. The use of the vibration data to determine the modal characteristics allows for the identification of a variety of mode shapes, including coupled-sway and torsional modes that typically exist for low- and mid-rise irregularly-shaped buildings. In some embodiments, separate modal characteristics are determined for the structural elements and the non-structural elements, and the remaining steps of the method 300 are applied separately for each set of modal characteristics.

In some embodiments, vibration data is not collected for each of the floors 200 in a building 100, but only for a subset of the floors 200, such as every second floor, every third floor, and the like. For the floor(s) 200 for which vibration data is not collected, modal characteristics can be estimated or extrapolated based on the vibration data for adjacent and/or nearby floors. In some cases a given floor 200 has a floor layout different from that of adjacent floors, and the nearest floor or floors having a similar floor layout can be used to estimate or extrapolate vibration data for the given floor 200. If two similar floors are equally near to the given floor 200, an average of the vibration data of the two similar floors can be used to estimate or extrapolate vibration data for the given floor 200. Other methods for estimating vibration data may also be used.

In some embodiments, modal modification factors are applied to some of the modal characteristics. Example modal modification factors include connection slippage, structural and non-structural element interaction, soil-structure interaction, material non-linear behaviour, foundation micro-fracturing, superstructure micro-fracturing, connection type, lateral load resisting system properties, and the like. Modal modification factors can be applied to the natural frequencies, the damping ratios, and the mode shapes to account for possible non-linear destruction of the building 100. For example, under the effect of a particular input earthquake, the building 100 can suffer destruction which exceeds linear displacements, rotations, and torques. In order to account for this destruction, the modal modification factors are applied. For example, the natural frequencies determined from the vibration data can be reduced by 30% for a steel building, and by 40% for a concrete building when modal modification factors are considered. Other modification factors may also be used.

At step 330, the computing device determines a mass, a centre-of-mass, and a moment of inertia for the floor 200. As described hereinabove, the floor 200 includes both structural elements, such as the floor surface 201, the structural supports 202, and the like, and non-structural elements 208. To determine the mass of the floor 200, the computing device may access information about the floor 200 from a database or other information source. The information may include blueprints, floor plans, finite-element models, and the like. The centre-of-mass and moment of inertia may be determined as described hereinabove.

At step 340, the computing device translates the modal characteristics from the data collection locations to the centre-of-mass location based on the floor structure of the floor 200. The modal characteristics determined at step 320 are determined at the data collection locations, which are dispersed throughout the floor 200. In order to centralize the modal characteristics, the modal characteristics are translated to the centre-of-mass 210. In some embodiments, a graphical platform is used to draw the floor layout, including the location of the centre-of-mass and the sensors locations. Then, the displacements and rotations of the floor 200 as measured from the vibration data by the sensors 110 are used to render the mode shapes of the floor 200. From the mode shapes, and using the rigid body principle, the displacement and rotation of the floor at the centre-of-mass can be extrapolated from the vibration data at the data location locations. In other embodiments, an optimization algorithm can be used to perform the translation numerically. In both aforementioned embodiments, the translation is based on in-plane rigidity for the floor surface 201. Other methods for translating the modal characteristics can also be used. For floor(s) 200 for which no vibration data was acquired, estimated or extrapolated modal characteristics may be translated instead At step 350, the computing device determines a seismic response of the building 100 to an input earthquake using the translated modal characteristics, the mass, and the moment of inertia of the floor 200. Having determined the translated modal characteristics at step 340, the building seismic response can be determined by time domain convolution integral in the linear range with the input earthquake. An equation of motion for the building model is considered in three dimensions, with 3×N degrees of freedom, where N is the number of stories of the building. The degrees of freedom include two horizontal translations and one in-plane rotational degree of freedom, per floor. This equation of motion considers coupling effects in sway modes and torsional modes. Torsional modes are considered when determining the seismic response for low-rise buildings of complex geometry that usually do not possess symmetric floor plans, for example schools and community centers with swimming pools and gymnasiums. The torsional modes also help in accounting for buildings having shapes which appear to look symmetric in geometry but have eccentricities between their center of mass and center of rigidity at different floor levels. In some embodiments, the seismic response for the structural elements of the floor 200 is determined independently from the seismic response for the non-structural elements 208. In some embodiments, the number of degrees of freedom can be increased to six per floor, three horizontal translations and three rotational degrees of freedom, with the total of 6×N degrees of freedom.

In embodiments where the floor 200 is partitioned into subsections, the seismic response of the building 100 may be determined on a per-subsection basis. In such cases, the equation of motion for the building model has 3×P degrees of freedom for the floor 200, where P is the number of subdivisions of the floor 200. In some embodiments, the equation of motion may also consider other factors, such as soil-structure interactions and P-Delta effects. In some embodiments, the number of degrees of freedom can be increased to six per-subsection, three horizontal translations and three rotational degrees of freedom, with the total of 6×P degrees of freedom for floor 200.

In some embodiments, the seismic response of the building 100 is determined in two parts. First, a linear response is determined using the translated modal characteristics, the mass, and the moment of inertia of the floor 200. Then, a non-linear response is determined by applying additional factors, such as the modal modification factors, and/or by accounting for other parameters of the building 100, such as building size, structural system (tensile, compressive, shear, bending, etc.), building materials, building connection types, lateral load resisting system properties, and the like.

The equation of motion is solved using a convolution integral, as described hereinabove. Alternatively, the equation of motion may be solved using Duhamel's integral or the Newmark method, or any other suitable numerical method. The equation of motion takes into account the modal characteristics, the mass of the floor(s), and the moment of inertia, which accounts for a floor height and other dimensions, as well as the position of floor joints, including corner joints, and the like.

The seismic response can provide information in a variety of response categories, including displacement and accelerations (relative and/or absolute) at any location and direction on floor(s) 200, overall seismic demands such as story shear forces, overturning moments, maximum displacements and accelerations at any floor(s) 200 and location drift ratios, which are indicative of fragility cure and building performance for different damage grades. Other response categories include drift ratios and absolute acceleration for the floor(s) 200 to determine the seismic response of non-structural elements 208, displacement and acceleration response spectra for any location for the floor(s) 200 to determine the seismic response of non-structural elements 208, and dynamic amplification portion of natural torsion for the floor(s) 200. To assess the seismic response of non-structural elements 208, other information about the non-structural elements 208, such as stiffness, natural frequency, and the like, may be used by the computing device.

The seismic response may be expressed in a number of different ways. In some embodiments, numerical values for any one or more of the response categories is presented in tabular or graphical form. In some embodiments, the seismic response is expressed as forces and/or torques experienced by the floor 200. The forces and/or torques can be displayed over a subdivided floor layout of the floor 200, with each subdivision being associated with a respective force and/or torque. In some other embodiments, the seismic response is expressed as a value representative of the success or stability of the building under the effect of the input earthquake, or representative of whether the building surpassed a given threshold. In some embodiments, the seismic response is expressed as a relative displacement vector at the centre of mass of the floor 200, or at any other point on the floor 200, and can include additional eccentricities based on dynamic amplification of natural torsion.

At step 360, the computing device can optionally associate a level of destruction to the building 100 as a result of the input earthquake based on the seismic response of the building. In some embodiments, the level of destruction is qualitative, and can be presented on a spectrum, for example from "no meaningful damage" to "complete destruction". Alternatively, the qualitative level of destruction can be indicative of the destruction of non-structural elements 208 on the floor 200, for example "supply cabinet doors may open" or "furniture not fixed to walls may topple". In some embodiments, the level of destruction is quantitative, for example a percentage of the floor 200, or the non-structural elements 208 on the floor 200, that are destroyed, damaged, and the like. Alternatively, the quantitative level of destruction may be a score or ranking indicative of the viability of the building 100 following the effects of the input earthquake. The level of destruction may also be expressed in other suitable ways, or as any combination of the ways described hereinabove.

Figure 4:
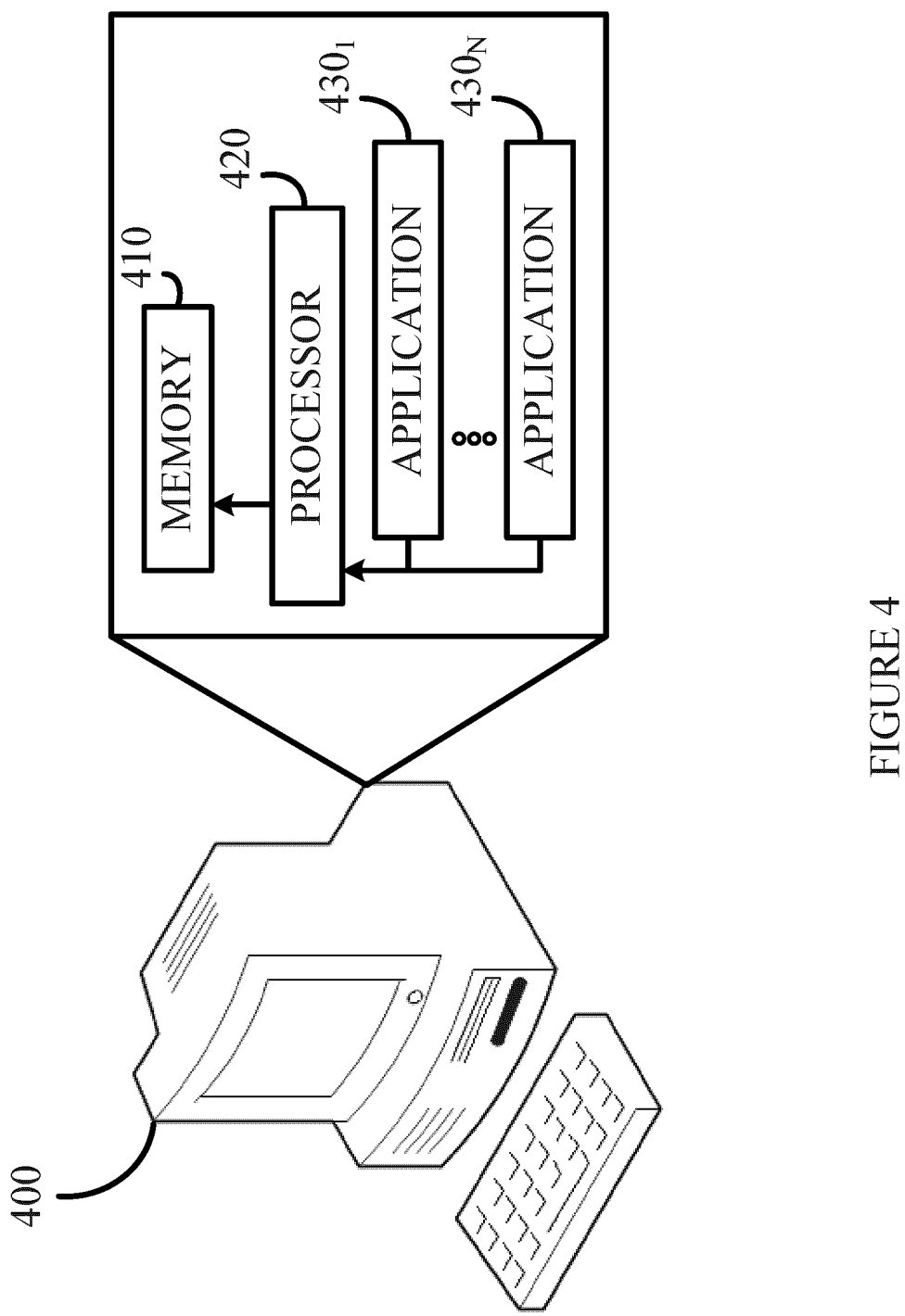
FIG. 4 is a block diagram of a computer system implementing the method of FIG. 3.

With reference to FIG. 4, as described hereinabove, the method 300 can be implemented by any suitable computing device, for example the computing device 400. The computing device 400 comprises any suitable type of processor 420, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The computing device 400 also comprises any suitable type of computer memory 410, the computer memory 410 being located internally or externally. For example, the computing device 400 includes random-access memory (RAM), read-only memory (ROM), optical-disc-based read-only memory, electro-optical memory, magneto-optical memory, erasable programmable read-only memory (EPROM), electrically-erasable programmable read-only memory (EEPROM), ferroelectric RAM (FRAM), and the like. The computing device 400 may comprises a network interface (not pictured) in order to communicate with other components, to access and connect to network resources, such as a database, and to perform other computing applications. The computing device 400 is configured to run or execute any number of applications $430_1$-$430_N$. The applications $430_1$-$430_N$ are stored in the memory 410, and are executed on the processor 420. One such application, for example application $430_1$, implements the method 300

Figure 5:
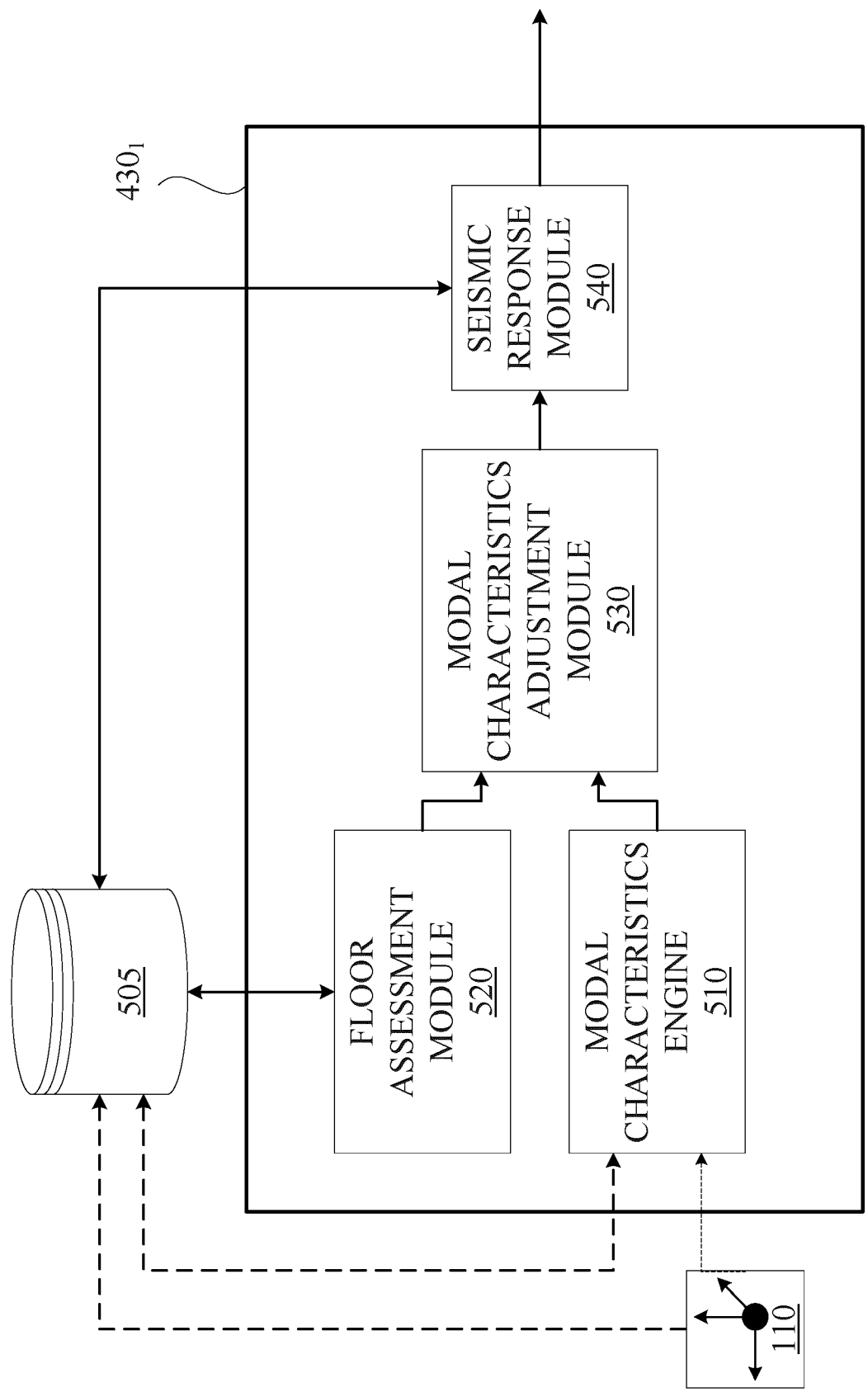
FIG. 5 is a block diagram of an application executed by the computer system for implementing the method of FIG. 3.

With reference to FIG. 5, the application $430_1$ includes a modal characteristics engine 510, a floor assessment module 520, a modal characteristic adjustment module 530, and a seismic response module 540. The application $430_1$ has access to a database 505 in which various information is stored. In some embodiments, the sensors 110 provide information to the application $430_1$ without going through an intermediary, whereas in other embodiments the sensors 110 provide information to application $430_1$ by way of the database 505.

The modal characteristics engine 510 is configured for receiving the vibration data, either from the sensors 110 or from the database 505. The modal characteristics engine 510 implements step 320 of the method 300, and uses the vibration data to determine the modal characteristics for the floor(s) 200. Once the modal characteristics engine 510 has determined the modal characteristics for the floor 200, the modal characteristics engine 510 provides the modal characteristics to the modal characteristics adjustment module 530. In some embodiments, the modal characteristics engine 510 also stores the modal characteristics in the database 505.

In some embodiments, the modal characteristics engine 510 uses machine learning to build algorithms or systems to determine the modal characteristics. For example, the modal characteristics engine 510 obtains a training dataset of vibration response data of known buildings. The training dataset has information about the characteristics of the known buildings, including the mass, centre-of-mass, and moment of inertia of each of the floors of the known buildings. The modal characteristics engine 510 is then trained with the training dataset to determine links between the vibration response data and the characteristics of the known buildings. Once trained, the modal characteristics engine 510 can determine the modal characteristics of the floor 200 of the building 100. Similar machine learning can also be used to determine modal modification factors.

The floor assessment module 520 is configured for determining the mass, centre-of-mass, and moment of inertia of the floor(s) 200 based on information obtained from the database 505. The floor assessment module 520 implements step 330 of the method 300. The database 505 may include floor layout information, as well as information about the non-structural elements 208 located on the floor(s) 200. The floor assessment module 520 is configured to provide the mass, the centre-of-mass, and the moment of inertia to the modal characteristics adjustment module 530. In some embodiments, the mass, the centre-of-mass, and the moment of inertia can also be stored in the database 505.

In some embodiments, the floor assessment module 520 is configured for determining the mass of the structural elements and the mass of the non-structural elements 208 separately. The floor assessment module 520 can then combine the masses and determine the centre-of-mass and the moment of inertia based on the overall floor mass.

The modal characteristics adjustment module 530 is configured to adjust the modal characteristics, including translating the modal characteristics from the data collection locations to the centre-of-mass and applying the modal modification factors. The modal characteristics adjustment module 530 implements step 340 of the method 300. In some embodiments, the modal characteristics adjustment module 530 first modifies some of the modal characteristics to account for non-linear destruction of the building 100 and/or to compensate for the material of which the building 100 is composed. The modal characteristics adjustment module 530 then translates the modal characteristics from the data collection locations to the centre-of-mass, using a graphical approach, an algorithmic approach, or any other suitable approach. The modal characteristics adjustment module 530 provides the adjusted modal characteristics to the seismic response module 540.

The seismic response module 540 is configured to determine the seismic response of the building 100 to an input earthquake. The seismic response module 540 implements step 350 of the method 300, and optionally implements step 360 of the method 300. The seismic response module 540 acquires an input earthquake from the database 505 and determines the seismic response of the building 100 to the input earthquake based on the adjusted modal characteristics and the mass and moment of inertia of the floor(s) 200 of the building 100. In some embodiments, the seismic response module 540 is configured to consider other factors, including soil-structure interactions and P-Delta effects. The seismic response module 540 optionally associates a level of destruction to the building as a result of the input earthquake, which may be qualitative or quantitative. The seismic response module 540 is also configured for storing the seismic response, and optionally the level of destruction, in the database 505. The seismic response and optionally the level of destruction, can also be output from the application 430$_1$ to other applications 430$_{2-N}$ running on the processor 420.

One embodiment proposes the use of low cost in-situ experimental modal tests, owing to advances in sensing techniques and analysis, to derive the essential structural characteristic of the buildings and then use this information to assess a seismic response and possible economic losses. The in-situ experimental modal tests make use of ambient vibration testing (AVT) to derive modal characteristics of buildings, including mode shapes, natural frequencies and damping ratio estimates, using frequency domain decomposition of recorded motions. The experimental modal properties are combined with building data collected from on-site inspection, and possibly with available architectural and structural plans, to provide input to an algorithm. Each building model can then be subjected to an ensemble of representative ground motion records and its global seismic demand parameters are computed by the algorithm.

Figure 6A:
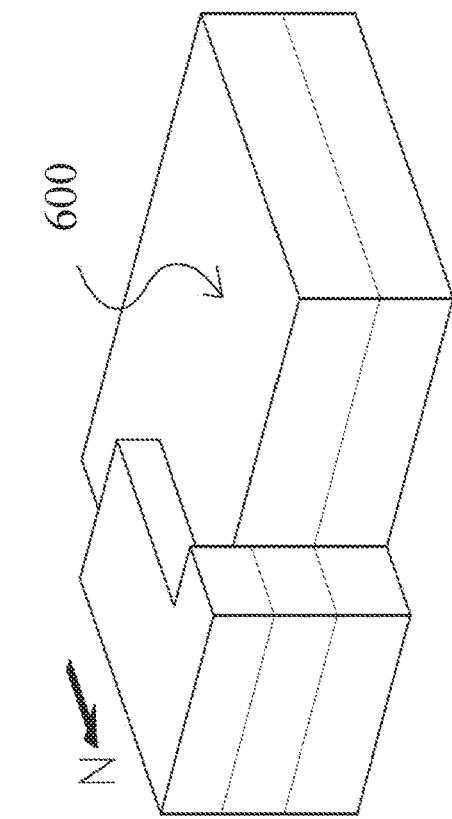
FIGS. 6A-E are overhead views of a test multi-story building.
Figure 6B:
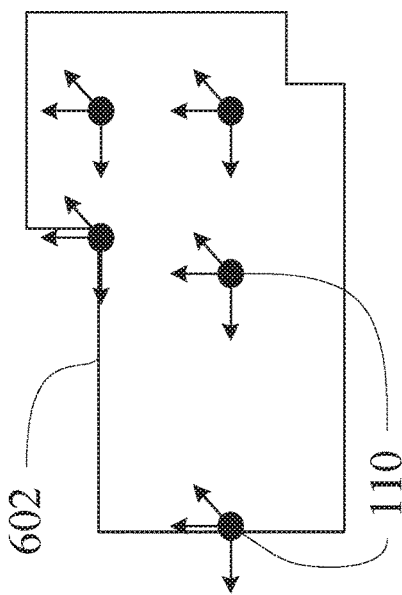
Figure 6E:
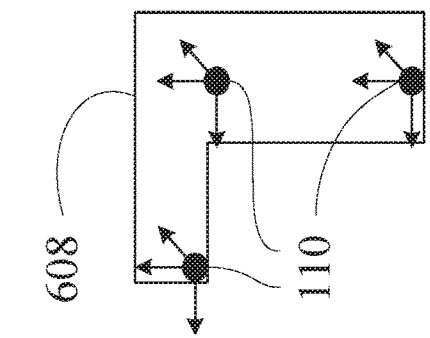
Figure 6D:
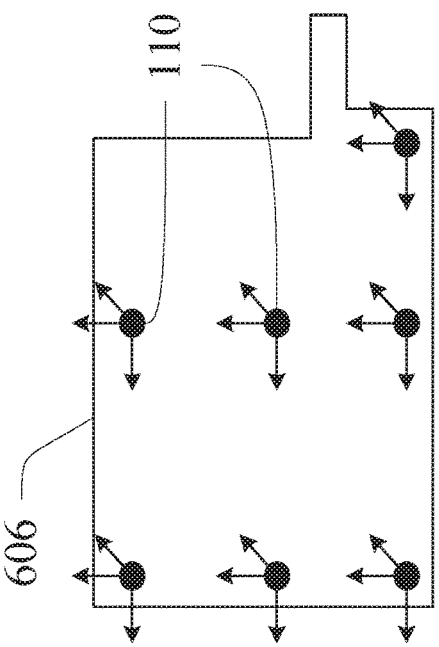
Figure 6C:
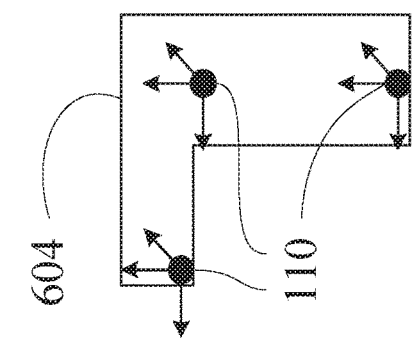

Turning now to FIGS. 6A-E, the method 300 has been applied to several case studies, one of which is building 600. Building 600 is a low-rise irregular building constructed in 1993 with a steel braced frame structural system. The height of the building 600 is about 20 m including one basement floor. A bird's-eye view of the building 600 is shown in FIG. 6A. FIGS. 6B-D are the outlines of a ground floor 602, a mechanical room 604, a bottom roof 606, and an upper roof 608 (roof of mechanical room 604), respectively. The sensors 110 are also shown as dispersed at respective data collection locations.

Figure 7A:
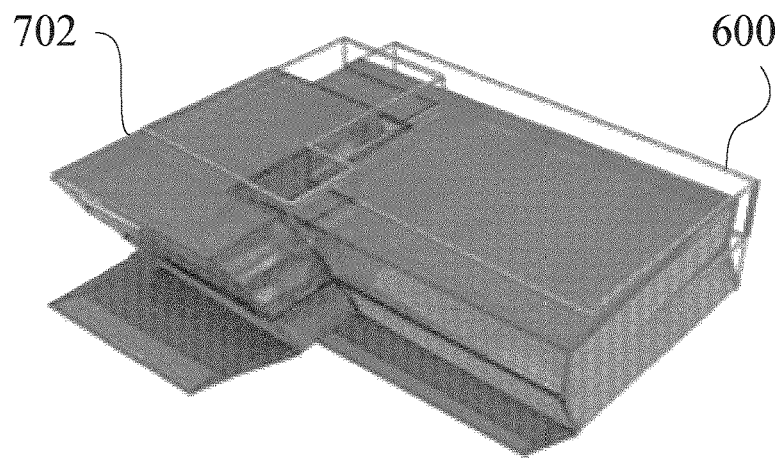
FIGS. 7A-C are perspective views of the test building of FIG. 6 under the effect of an input earthquake.
Figure 7B:
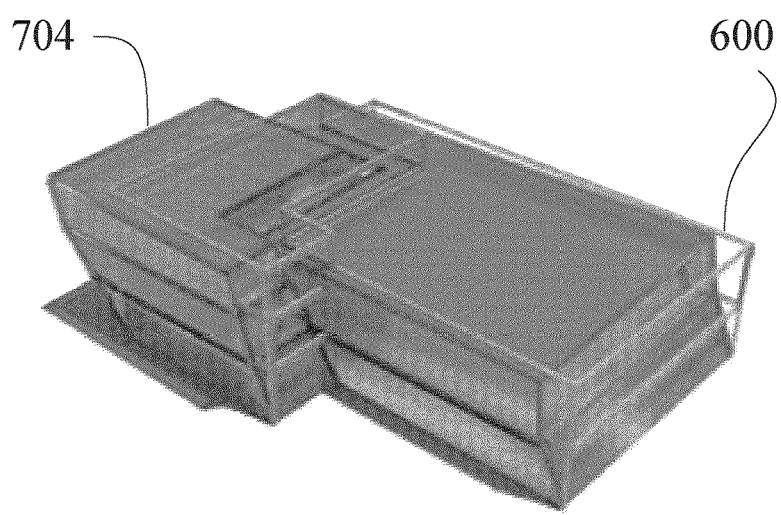
Figure 7C:
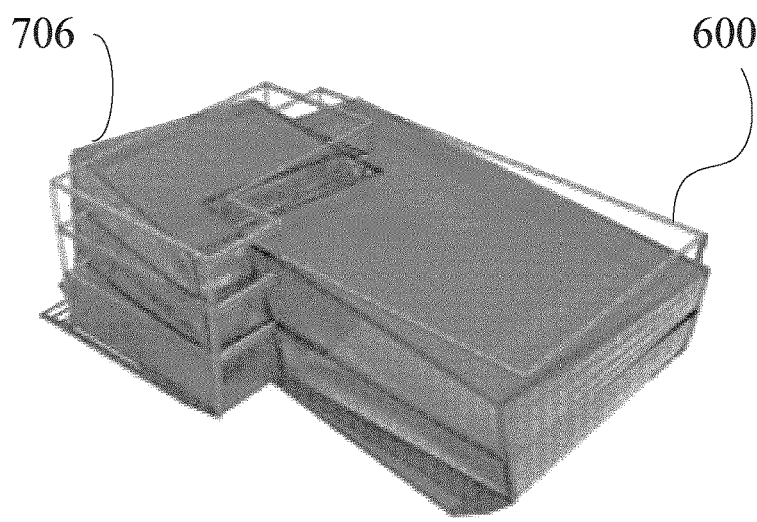

With reference to FIGS. 7A-C, mode shapes, natural periods, and damping ratios for the building 600, obtained from the vibration data, are shown compared to a non-deformed outline of the building 600. FIG. 7A shows a first flexural-torsional mode 702, having a natural period of 0.24 s and a damping ratio of 0.016. FIG. 7B shows a second flexural-torsional mode 704, having a natural period of 0.24 s and a damping ratio of 0.012. FIG. 7C shows a first torsional mode 706, having a natural period of 0.18 s and a damping ratio of 0.023.

Figure 8:
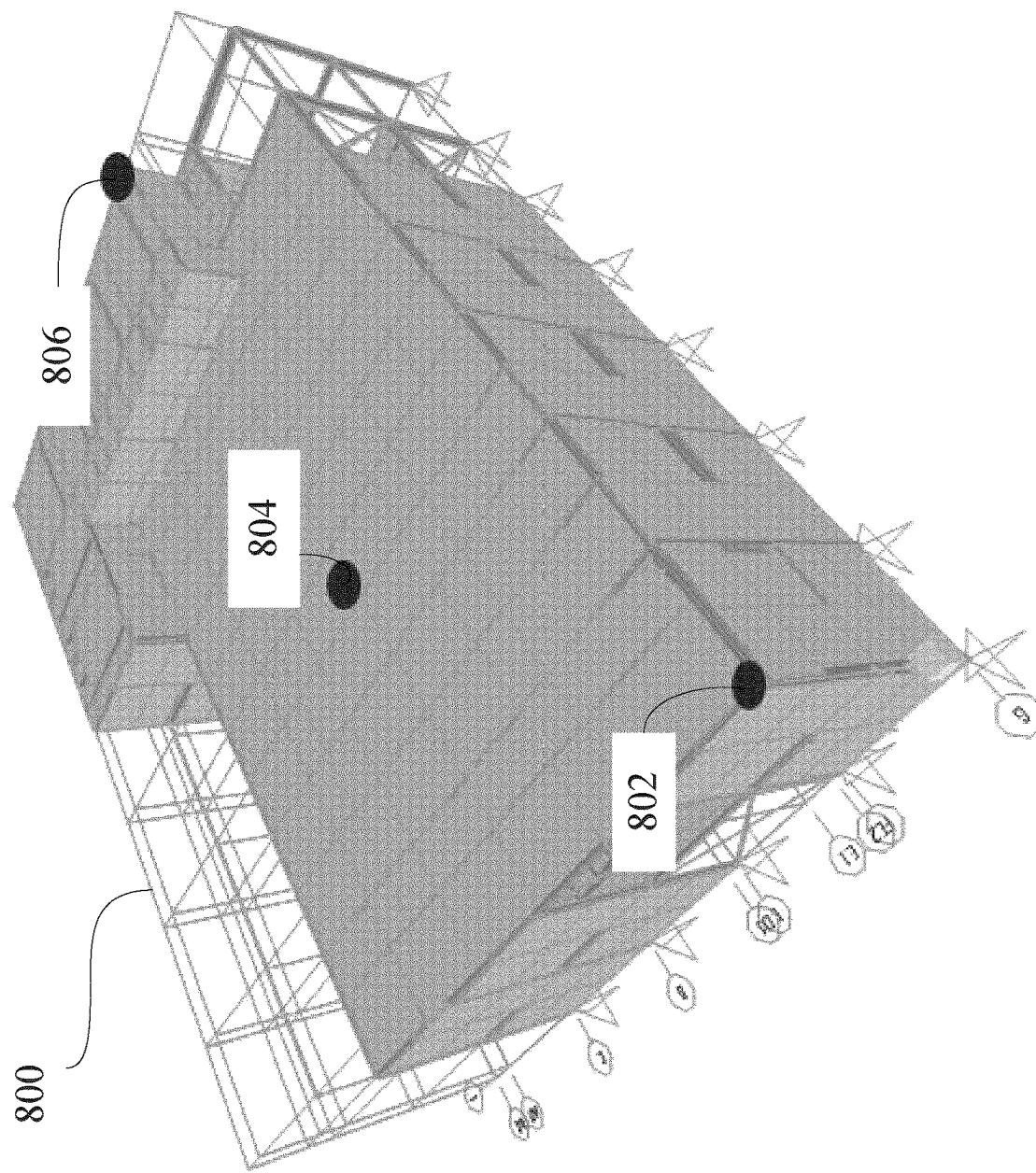
FIG. 8 is a perspective view of a finite-element (FE) model of the test building of FIG. 6.

In order to validate the method 300, the seismic response determined by the method 300 is compared against a seismic response of a finite-element model of the building 600, and against a seismic response of a calibrated finite-element model of the building 600. With reference to FIG. 8, there is shown a finite element model 800 of the building 600 having a first corner joint 802, a center-of-mass 804, and a second corner joint 806. The finite element model can be created using any suitable modeling program or tool, and serves as the first comparison basis for the method 300. The finite element model 800 is also calibrated with the vibration data acquired by the sensors 110 to serve as the second comparison basis for the method 300.

To ensure that the calibration applied to the finite element model is adequate, the natural frequencies and mode shapes (by modal assurance criteria) of the calibrated finite element model are compared to the natural frequencies and mode shapes determined from the vibration data. The comparison is presented in Tables 1 and 2, with the finite element model values being presented as "FE model", and the vibration data values being presented as "AVT".

TABLE 1

Natural Frequencies Comparison

| | 1st mode frequency | 2nd mode frequency | 3rd mode frequency |
|---|---|---|---|
| FE model (Hz) | 4.1 | 5.0 | 7.0 |
| AVT (Hz) | 4.1 | 4.2 | 5.7 |
| Difference (%) | 0 | 19 | 23 |

TABLE 2

Mode Shape Correlation by Modal Assurance Criteria (MAC)

| | | FE model | | |
|---|---|---|---|---|
| | | Mode1 | Mode2 | Mode3 |
| AVT | Mode1 | 0.97 | 0.00 | 0.04 |
| | Mode2 | 0.02 | 0.92 | 0.00 |
| | Mode3 | 0.01 | 0.01 | 0.80 |

Figure 9:
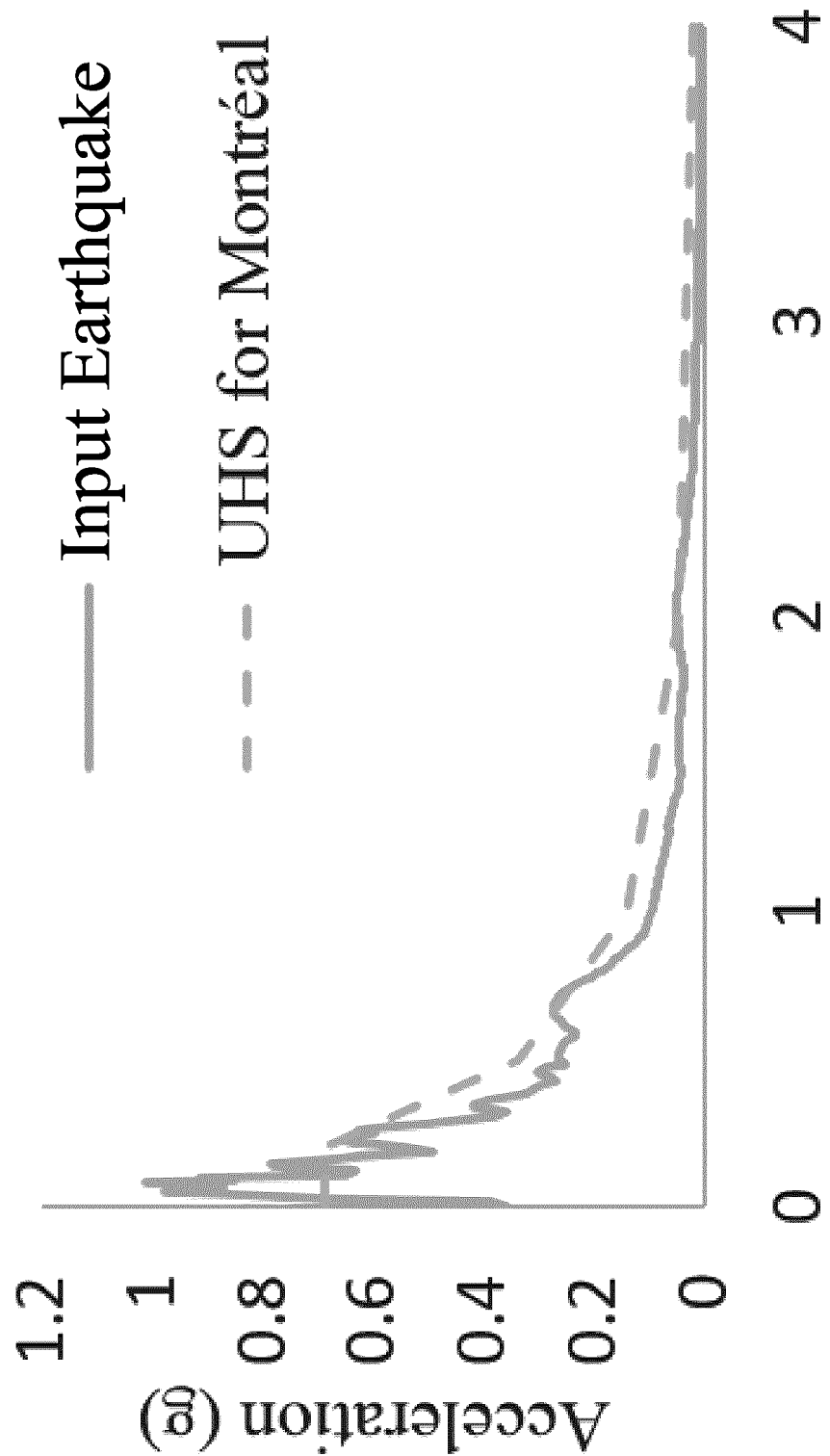
FIG. 9 is a graph illustrating a response spectrum of an input earthquake and a uniform hazard spectrum for Montréal, Canada.

The input earthquake used at step 350 of the method 300 is then applied as an input earthquake for the finite element model and for the calibrated finite element model, and a response is determined for both models. In a first test case, the input earthquake corresponds to a magnitude 6 earthquake, having an epicentre distance of 30 km from the building 600, a duration of 8.89 s, a return period of 2500 years, and is scaled appropriately to be compatible with the Uniform Hazard Spectra (UHS) for Montréal based on the 2010 National Building Code (NBC) of Canada. The input earthquake and the UHS for Montréal are illustrated in FIG. 9. The seismic response determined by the method 300 is then compared to the seismic response of the finite element model and to the seismic response of the calibrated finite element model.

Figure 10C:
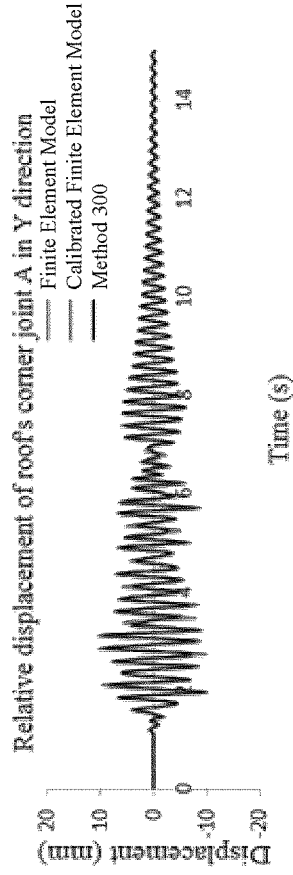
FIGS. 10A-D are comparative graphs illustrating the differences in seismic response assessments obtained by the method of FIG. 3 and prior art methods.
Figure 10D:
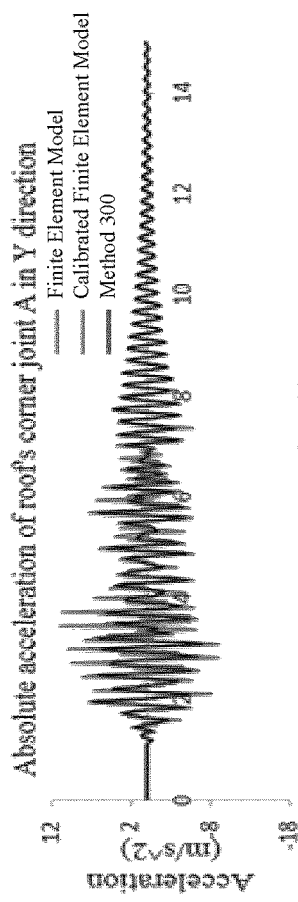
Figure 10A:
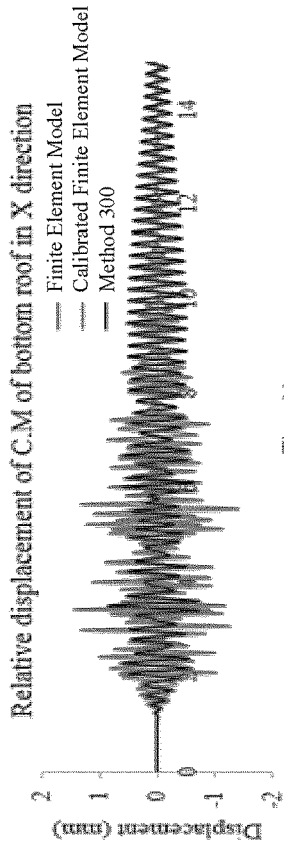
Figure 10B:
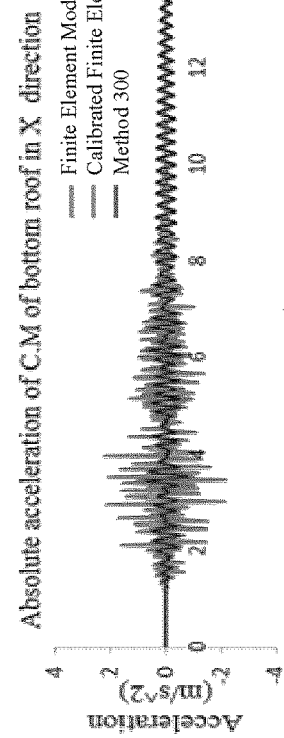
Figure 11A:
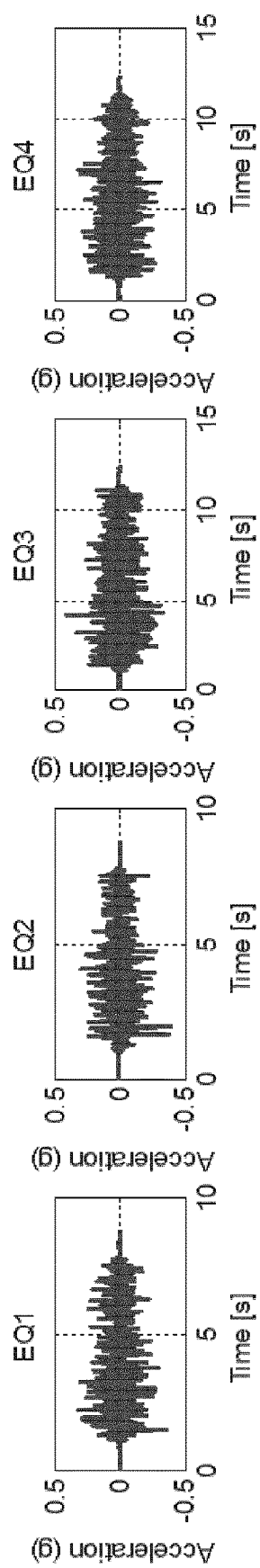
FIGS. 11A-J are graphs illustrating ten synthetic selected input earthquakes for Montréal.
Figure 11B:
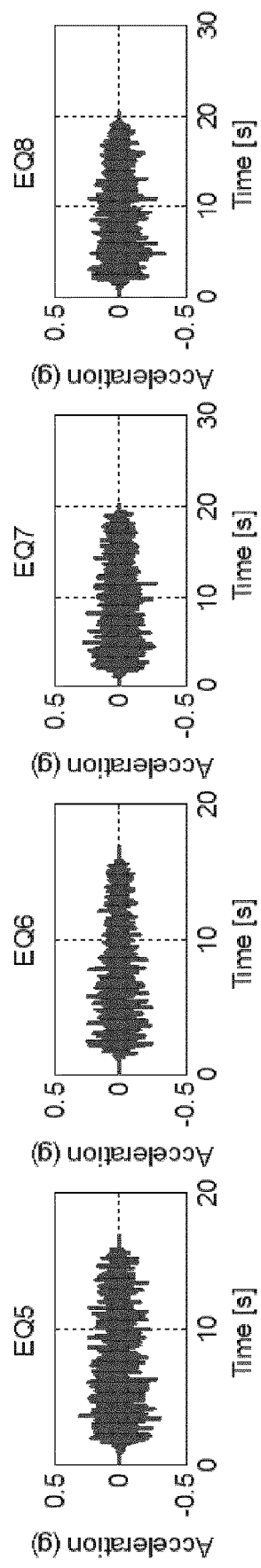
Figure 11C:
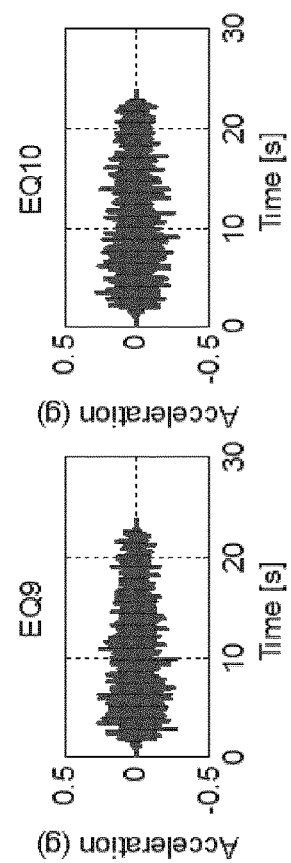
Figure 11D:
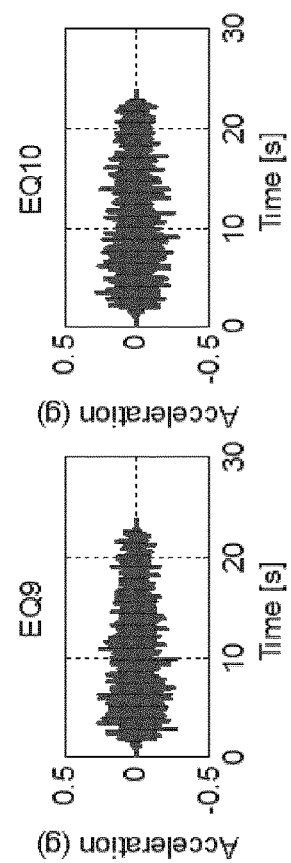
Figure 11E:
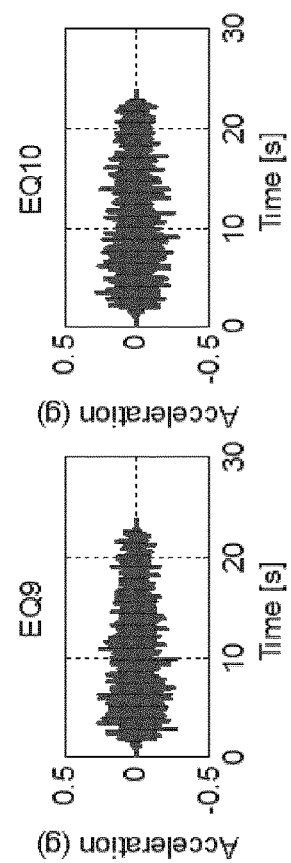
Figure 11F:
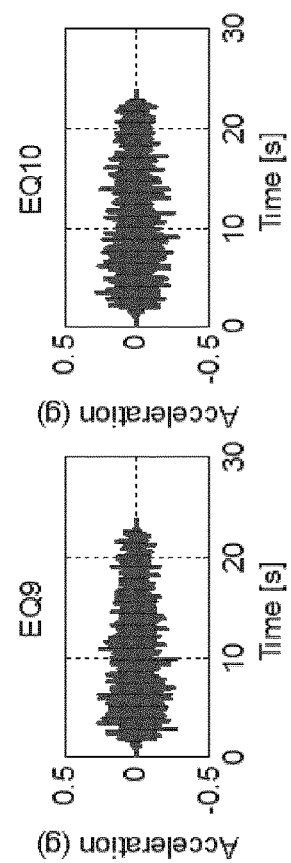
Figure 11G:
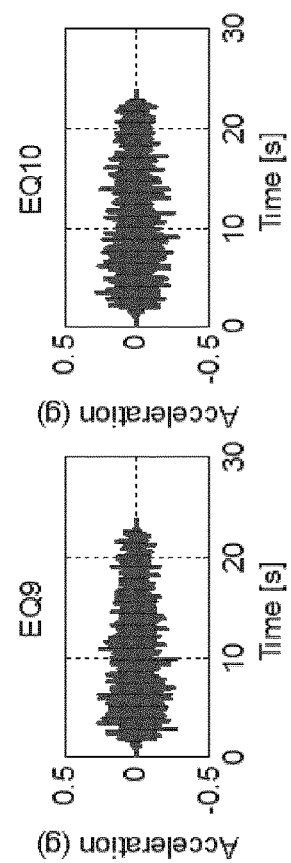
Figure 11H:
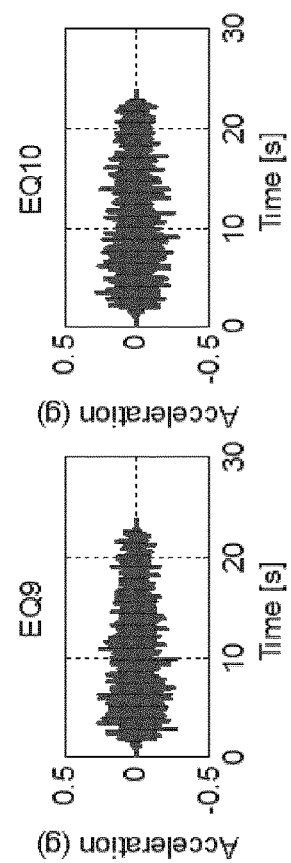
Figure 11I:
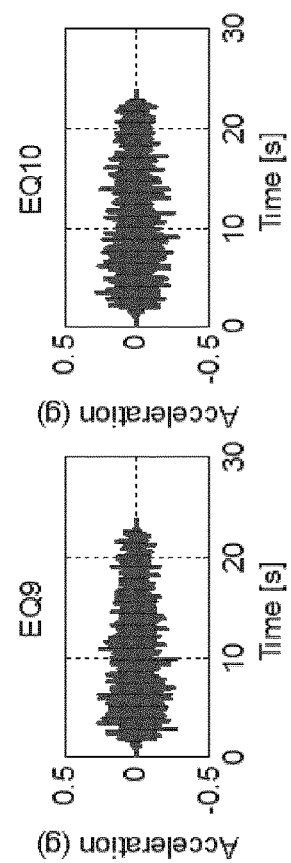
Figure 11J:
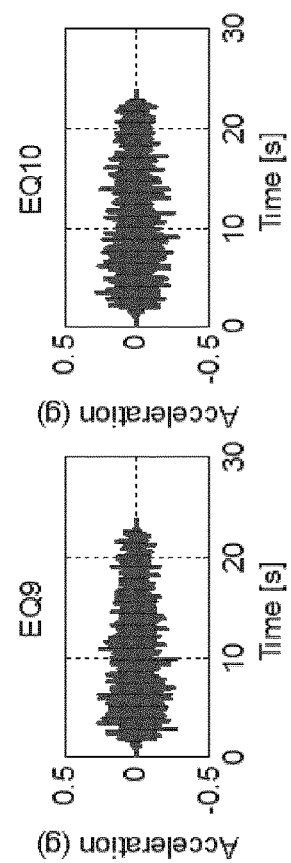
Figure 12A:
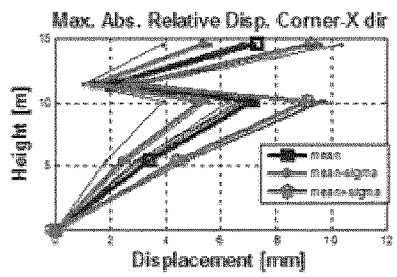
FIGS. 12A-J are graphs illustrating example results of seismic responses for the test building based on the method of FIG. 3.
Figure 12B:
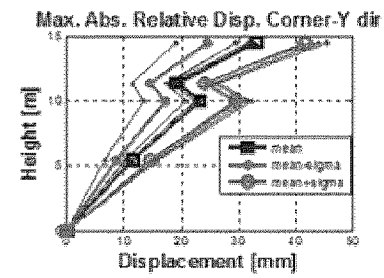
Figure 12C:
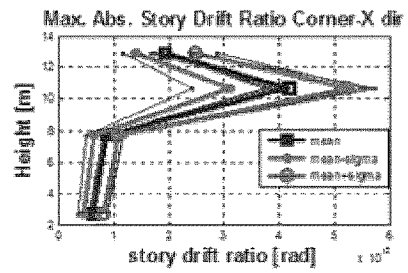
Figure 12D:
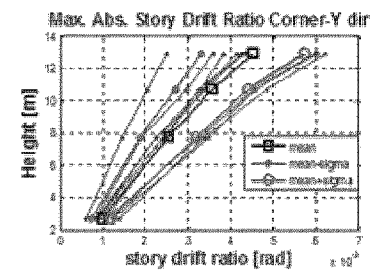
Figure 12E:
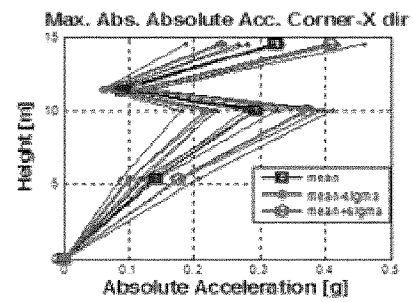
Figure 12F:
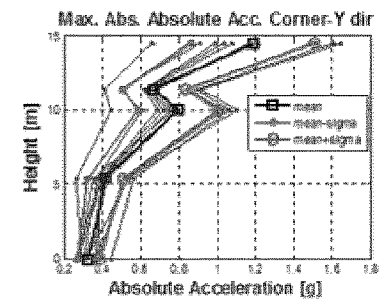
Figure 12G:
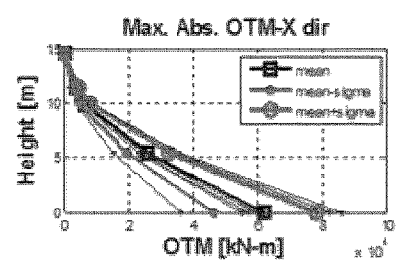
Figure 12H:
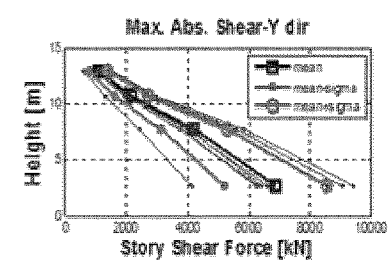
Figure 12I:
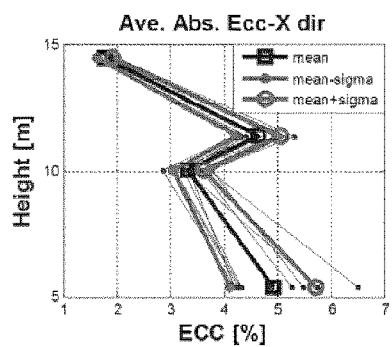
Figure 12J:
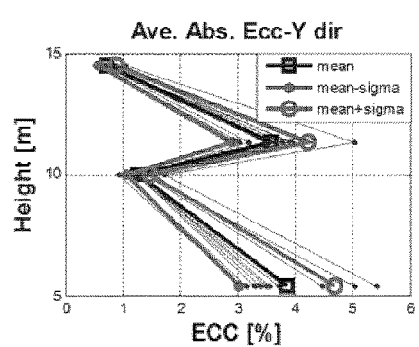

In the first test case, the seismic response categories examined are displacement and acceleration data for the first corner joint 802 and the centre of mass 804. The determined seismic responses for the finite element model, from the calibrated finite element model, and from the method 300 are compared in FIGS. 10A-D. With reference to FIGS. 10A and B, the seismic response for the centre-of-mass 804 for the method 300 agrees with the data from the calibrated finite element model, but the data from the finite element model shows an exaggerated early seismic response. With reference to FIG. 10C, the displacement data for the first corner joint 802 for the method 300, the finite element model, and the calibrated finite element model agree. With reference to FIG. 10D, the acceleration data for the first corner joint 802 for the finite element model exaggerates the seismic response, whereas the method 300 and the calibrated finite element model agree. This test case proves that as finite element model is better calibrated to the vibration data its results will converge more toward method 300, in the ideal case of 100% calibrated finite element model the response predictions from both methods will match perfectly.

In a second test case, the calibrated finite element model is updated to use a more accurate finite element model accounting for material densities, connection behaviours, infill walls, and the like. The seismic response of the updated calibrated finite element model yields the same results as those determined by the method 300.

With reference to FIGS. 11A-J, a third test case is performed by providing the method 300 with ten input earthquakes to be applied to the building 600. Various response categories were obtained, including maximum relative floor displacements and floor absolute accelerations for any point on the floors and direction, story shear forces, story drift ratios overturning moments, measured eccentricities and floor displacement and acceleration response spectra, as well as average values and standard deviations for each category. These results are shown in FIGS. 12A-J.

It should be noted that although the foregoing discussion has focused primarily on detecting seismic responses in buildings, such as the building 100, the techniques discussed herein can also be applied to bridges, tunnels, towers, and other man-made structures.

Each computer program described herein may be implemented in a high level procedural or object oriented programming or scripting language, or a combination thereof, to communicate with a computer system. Alternatively, the programs may be implemented in assembly or machine language. The language may be a compiled or interpreted language. Each such computer program may be stored on a storage media or a device, for example a ROM, a magnetic disk, an optical disc, a flash drive, or any other suitable storage media or device. The computer program may be readable by a general or special-purpose programmable computer for configuring and operating the computer when the storage media or device is read by the computer to perform the procedures described herein. Embodiments of the system may also be considered to be implemented by way of a non-transitory computer-readable storage medium having a computer program stored thereon. The computer program may comprise computer-readable instructions which cause a computer, or more specifically the at least one processing unit of the computer, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the present seismic assessment method and system may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The appended claims are to encompass within their scope all such changes and modifications.

What is claimed is:

1. A method, comprising:
obtaining vibration data from sensors for at least one floor of a man-made structure, the vibration data indicative of ambient vibration levels at data collection locations of the man-made structure;
determining modal characteristics for the data collection locations of the at least one floor based on the vibration data;
determining a mass, a centre-of-mass location, and a moment of inertia of the at least one floor;
translating the modal characteristics from the data collection locations to the centre-of-mass location based on a floor structure of the at least one floor;
determining a seismic response of the man-made structure to an input earthquake using the translated modal characteristics, the mass, and the moment of inertia of the at least one floor; and associating a level of destruction to the man-made structure as a result of the input earthquake based on the seismic response.

2. The method of claim 1, wherein determining the seismic response comprises evaluating equations of motion in at least three dimensions, the equations of motion having 3N degrees of freedom, where N is a number of storeys of the man-made structure.

3. The method of claim 1, wherein determining the seismic response comprises at least one of:
   determining a structural elements seismic response based on a floor structure mass; and
   determining a non-structural elements seismic response, comprising extrapolating at least one of acceleration, displacement, and drift ratio values at least one non-structural element position based on the translated modal characteristics and a non-structural elements mass and at least one of non-structural elements stiffness and non-structural elements natural frequency.

4. The method of claim 1, wherein determining the seismic response comprises applying modal modification factors to at least some of modal characteristics.

5. The method of claim 4, wherein applying modal modification factors to at least some of modal characteristics comprises determining modal modification factors by:
   obtaining a training dataset of known modal modification factors of other man-made structures;
   training a modal characteristics adjustment module with the training dataset; and
   determining the modal modification factors with the trained modal characteristics adjustment module.

6. The method of claim 1, wherein determining the seismic response comprises:
   determining a linear seismic response of the man-made structure to the input earthquake using the translated modal characteristics, the mass, and the moment of inertia of the at least one floor; and
   determining a non-linear seismic response from the linear seismic response based on at least one of a structural system, structure size, structure material, structure connection types, and lateral load resisting system properties.

7. The method of claim 1, wherein determining modal characteristics comprises:
   obtaining a training dataset of known vibration response data of other man-made structures;
   training a modal characteristics engine with the training dataset; and
   determining the modal characteristics with the trained modal characteristics engine.

8. The method of claim 1, wherein translating the modal characteristics from the data collection locations to the centre-of-mass location based on a floor structure is performed by one of a graphical analysis and algorithmic optimization.

9. The method of claim 1, wherein determining the mass, the centre-of-mass location, and the moment of inertia comprises:
   partitioning the floor into at least two partitions; and
   determining the mass, the centre-of-mass, and the moment of inertia for each partition;
   wherein translating the modal characteristics and determining a seismic response is performed on a per-partition basis.

10. A system, comprising:
    a processing unit; and
    a memory communicatively coupled to the processing unit and comprising computer-readable program instructions executable by the processing unit for:
       obtaining vibration data from sensors for at least one floor of a man-made structure, the vibration data indicative of ambient vibration levels at data collection locations of the man-made structure;
       determining modal characteristics for the data collection locations of the at least one floor based on the vibration data;
       determining a mass, a centre-of-mass location, and a moment of inertia of the at least one floor;
       translating the modal characteristics from the data collection locations to the centre-of-mass location based on a floor structure of the at least one floor;
       determining a seismic response of the man-made structure to an input earthquake using the translated modal characteristics, the mass, and the moment of inertia of the at least one floor; and
       associating a level of destruction to the man-made structure as a result of the input earthquake based on the seismic response.

11. The system of claim 10, wherein determining the seismic response comprises evaluating equations of motion in at least three dimensions, the equations of motion having 3N degrees of freedom, where N is a number of storeys of the man-made structure.

12. The system of claim 10, wherein determining the seismic response comprises at least one of:
    determining a structural elements seismic response based on a floor structure mass; and
    determining a non-structural elements seismic response, comprising extrapolating at least one of acceleration, displacement, and drift ratio values at least one non-structural element position based on the translated modal characteristics and a non-structural elements mass and at least one of non-structural elements stiffness and non-structural elements natural frequency.

13. The system of claim 10, wherein determining the seismic response comprises applying modal modification factors to at least some of the modal characteristics.

14. The system of claim 13, wherein determining modal characteristics comprises:
    obtaining a training dataset of known vibration response data of other man-made structures;
    training a modal characteristics engine with the training dataset; and
    determining the modal characteristics with the trained modal characteristics engine.

15. The system of claim 13, wherein applying modal modification factors to at least some of modal characteristics comprises determining modal modification factors by:
    obtaining a training dataset of known modal modification factors of other man-made structures;
    training a modal characteristics adjustment module with the training dataset; and
    determining the modal modification factors with the trained modal characteristics adjustment module.

16. The system of claim 10, wherein determining the seismic response comprises:
    determining a linear seismic response of the man-made structure to the input earthquake using the translated modal characteristics, the mass, and the moment of inertia of the at least one floor; and
    determining a non-linear seismic response from the linear seismic response based on at least one of a structural system, structure size, structure material, structure connection types, and lateral load resisting system properties.

17. The system of claim 10, wherein translating the modal characteristics from the data collection locations to the centre-of-mass location is performed by one of a graphical analysis and algorithmic optimization.

18. The system of claim 10, wherein determining the mass, the centre-of-mass location, and the moment of inertia comprises:
   partitioning the floor into at least two partitions; and
   determining the mass, the centre-of-mass, and the moment of inertia for each partition;
   wherein translating the modal characteristics and determining a seismic response is performed on a per-partition basis.

* * * * *